United States Patent
Gyarmati et al.

(10) Patent No.: US 12,553,502 B2
(45) Date of Patent: Feb. 17, 2026

(54) TRANSMISSION FOR A VEHICLE DRIVE TRAIN

(71) Applicant: ZF Friedrichshafen AG, Friedrichshafen (DE)

(72) Inventors: Tamas Gyarmati, Bermatingen (DE); Philip Dötschel, Friedrichshafen (DE); Matthias Reisch, Ravensburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 19/057,345

(22) Filed: Feb. 19, 2025

(65) Prior Publication Data
US 2025/0189026 A1    Jun. 12, 2025

Related U.S. Application Data

(63) Continuation of application No. 18/440,262, filed on Feb. 13, 2024, now Pat. No. 12,253,150.

(30) Foreign Application Priority Data

Feb. 14, 2023 (DE) .......... 102023201185.9

(51) Int. Cl.
| | |
|---|---|
| *F16H 48/10* | (2012.01) |
| *B60K 17/16* | (2006.01) |
| *F16H 48/38* | (2012.01) |

(52) U.S. Cl.
CPC .......... *F16H 48/10* (2013.01); *B60K 17/16* (2013.01); *F16H 48/38* (2013.01); *F16H 2048/104* (2013.01); *F16H 2048/106* (2013.01)

(58) Field of Classification Search
CPC ...... F16H 37/0833; F16H 48/10; F16H 48/38; F16H 2048/104; F16H 2048/106; F16H 2048/368; F16H 2200/2007; B60K 17/16
See application file for complete search history.

(56) References Cited

U.S. PATENT DOCUMENTS

| | | | |
|---|---|---|---|
| 7,140,997 B2 | 11/2006 | Tiesler | |
| 2005/0032604 A1 | 2/2005 | Hill | |
| (Continued) | | | |

FOREIGN PATENT DOCUMENTS

| | | |
|---|---|---|
| DE | 102017112880 A1 | 12/2017 |
| DE | 102018112880 A1 | 12/2018 |
| (Continued) | | |

OTHER PUBLICATIONS

German Search Report for Application No. 102023201185.9 dated Feb. 3, 2024.
(Continued)

*Primary Examiner* — Edwin A Young
(74) *Attorney, Agent, or Firm* — Dority & Manning, P.A.

(57) ABSTRACT

A transmission (1) for a drive train of a vehicle (100) includes an input shaft (2), a first output shaft (3), a second output shaft (4) and a differential arranged in power flow between the input shaft (2) and the two output shafts (3, 4). A first output torque is transmittable onto the first output shaft (3) by the first planetary gear set (5). A support torque of the first planetary gear set (5) is convertible in the second planetary gear set (6) such that a second output torque is transmittable onto the second output shaft (4). The second planetary gear set (6) is axially adjacent to the first planetary gear set (5), and the planet gears (5.4) of the first planetary gear set (5) do not axially overlap the planet gears (6.4) of the second planetary gear set (6). A second gear set element in the first planetary gear set (5) is a ring gear (5.2) and is connected to a first gear set element in the second planetary gear set (6), which is a sun gear (6.1), for conjoint rotation. The sun gear (6.1) of the second planetary gear set (6) is arranged on an end face of the ring gear (5.2) of the first planetary gear set (5) and axially fixed by a securing ring (17).

13 Claims, 4 Drawing Sheets

(56) References Cited

U.S. PATENT DOCUMENTS

2013/0324354 A1 12/2013 Phebus
2016/0252171 A1* 9/2016 Hederstad ............... F16H 48/11
                                                          475/204
2016/0305529 A1 10/2016 Tronnberg

FOREIGN PATENT DOCUMENTS

| DE | 102019216507 A1 | 4/2021 |
| DE | 102021200523 A1 | 7/2021 |
| DE | 102021212217 A1 | 5/2022 |
| DE | 102021200527 A1 | 7/2022 |
| DE | 102021207527 A1 | 1/2023 |

OTHER PUBLICATIONS

Joachim et al., "Druckkammtechnik in Fahrzeuggertrieben", VDI Berichte, Mar. 1998, pp. 279-312, ISBN 978-3-18-091380-3.

* cited by examiner

TRANSMISSION FOR A VEHICLE DRIVE TRAIN

CROSS-REFERENCE TO RELATED APPLICATIONS

The present application has right of priority to German Patent Application No. DE102023201185.9 filed on Feb. 14, 2023 and to U.S. patent application Ser. No. 18/440,262 field on Feb. 13, 2024, both of which are incorporated by reference in their entirety for all purposes.

TECHNICAL FIELD

The invention relates generally to a transmission for a drive train of a vehicle. The invention further relates generally to a vehicle which has a drive train, which includes a prime mover and a transmission of this type.

BACKGROUND

DE 10 2021 200 527 A1 describes a drive train for a motor vehicle. The drive train includes an internal combustion engine, a multi-speed transmission and an integral differential. The differential has two planetary gear sets, each planetary gear set being drivingly connected to a respective output shaft. The differential and the respective output shaft are designed to be arranged coaxially with an output axle of the motor vehicle, the internal combustion engine and the multi-speed transmission being axially parallel to the output axle. A first output torque is transmittable onto the second output shaft by the first planetary gear set. A support torque of the first planetary gear set is convertible in the second planetary gear set such that a second output torque, which corresponds to the first output torque, is transmittable onto the first output shaft.

BRIEF SUMMARY

Example aspects of the present invention provide a compact and efficient transmission for a drive train of a vehicle. In particular, the transmission is to include a differential having a high ratio. Moreover, the transmission is to be easily and quickly installable.

A transmission according to example aspects of the invention for a drive train of a vehicle includes an input shaft, a first output shaft, a second output shaft and a differential, which is arranged in the power flow between the input shaft and the two output shafts, wherein the differential has a first planetary gear set, which includes multiple planet gears and multiple gear set elements, and a second planetary gear set, which includes multiple planet gears and multiple gear set elements, wherein a first output torque is transmittable onto the first output shaft by the first planetary gear set, wherein a support torque of the first planetary gear set is convertible in the second planetary gear set such that a second output torque, which corresponds to the first output torque, is transmittable onto the second output shaft, wherein a first gear set element in the first planetary gear set is connected to the input shaft for conjoint rotation, wherein a third gear set element in the first planetary gear set is connected to the first output shaft for conjoint rotation, wherein a second gear set element in the second planetary gear set is connected to the second output shaft for conjoint rotation, wherein a third gear set element in the second planetary gear set is connected to a stationary component for conjoint rotation, wherein the second planetary gear set is axially adjacent to the first planetary gear set and the planet gears of the first planetary gear set do not axially overlap the planet gears of the second planetary gear set, wherein a second gear set element in the first planetary gear set is in the form of a ring gear and is connected to a first gear set element in the second planetary gear set, which is in the form of a sun gear, for conjoint rotation, the sun gear of the second planetary gear set being arranged on an end face of the ring gear of the first planetary gear set and axially fixed by a securing ring.

In other words, the ring gear of the first planetary gear set and the sun gear of the second planetary gear set are two separate transmission components, which are connected to each other for conjoint rotation, in particular in a disconnectable manner, and are axially fixed to one another by the securing ring. Furthermore, the two planetary gear sets of the differential are not radially stacked, but rather arranged axially next to each other, such that the planet gears of the two planetary gear sets do not axially overlap. The gear set elements in the first and the second planetary gear sets are therefore arranged in two planes which are axially spaced apart. In particular, no components which do not belong to one of the two planetary gear sets are arranged axially between the two planetary gear sets. Preferably, the second planetary gear set is arranged with its gear set elements in a radial direction outside a rotation axis of the particular planet gear in the first planetary gear set. As a result, installation space is created radially inside the second planetary gear set, which can be advantageously used, in particular, for supporting points or for the oil feed. The two planetary gear sets together form an integral differential.

An "integral differential" should be understood to be a differential which has a first planetary gear set and a second planetary gear set, wherein the first planetary gear set is drivingly connected to the input shaft, to the second planetary gear set and to the first output shaft. The second planetary gear set is drivingly connected to the second output shaft. The integral differential has no gears that rotate as a unit, or without a rolling motion, when the output rotational speeds of the output shafts are identical. Therefore, there is always relative movement of the intermeshed components of the integral differential regardless of the output rotational speeds of the output shafts. In an integral differential, the sums of the two wheel torques are not combined to form a single axle torque in a component. Instead, a drive power is divided in the integral differential and applied onto the output shafts operatively connected to the planetary gear sets in accordance with the design of the first and the second planetary gear sets. Therefore, the components of the integral differential can be slimmer due to the respective, relatively low torque. In addition, the number of components is reduced and weight is reduced. By an integral differential of this type, the two functions, namely torque conversion and torque distribution, which are generally carried out by two separate assemblies, can be carried out using one single integral assembly. The integral differential is therefore a combined transmission and differential which converts as well as distributes torque onto the output shafts.

A "planetary gear set" should be understood as a unit having the gear set elements sun gear, ring gear and planet carrier. The planet carrier guides multiple planet gears, which are arranged on a circular path around the sun gear and are meshed with the ring gear and the sun gear. In particular, the planet gears are rotatably accommodated on the planet carrier via planetary gear pins.

The input shaft is preferably designed to be at least indirectly connected to a drive shaft of a drive unit for conjoint rotation, in particular to a rotor shaft of an electric prime mover. The drive unit generates drive power, which is transmitted onto the input shaft via the drive shaft. The drive shaft of the drive unit can be connected to the input shaft for conjoint rotation. Alternatively, the drive shaft and the input shaft are in the form of a monolithic component. Depending on the design of the drive train, two or more input shafts can also be provided, in particular when the drive train is a hybridized drive train and, therefore, two or more drive units are provided.

The term "at least indirectly" should be understood to mean that two components are connected to each other via at least one further component, which is arranged between the two components, or are directly and, therefore, immediately connected to each other. Therefore, other components can be arranged between shafts or gear wheels, the components being operatively connected to the shaft or to the gear wheel.

The input shaft is preferably a hollow shaft. As a result, one of the output shafts, preferably the first output shaft, can fit axially inside the input shaft. One of the output shafts, in particular the first output shaft, preferably extends through the transmission and potentially through the drive unit in the power train.

The output shafts of the transmission are designed, in particular, to be operatively connected to a respective wheel on the vehicle. The particular output shaft can be connected to the associated wheel directly or indirectly, for example, via a joint and/or a wheel hub. The output shafts are preferably coaxial to one another. Due to the coaxial arrangement of the output shafts, a radially slender design of the transmission can be realized.

Further interconnected components can be arranged between the input shaft and the drive unit, which are formed, for example, as a planetary transmission, a spur gear drive, a sprocket, a belt drive, a bevel gear, a universal joint shaft, a torsional shock absorber, a multi-speed transmission or the like. Further interconnected components can be arranged between the particular output shaft and the wheel operatively connected thereto, such as, for example, universal joint shafts, transmission gearing, spring and damping elements or the like.

A "shaft" should be understood as a rotatable component in the transmission, via which associated components of the transmission are each connected to one another for conjoint rotation. The shaft can connect the components to one another axially or radially or also both axially and radially. A shaft should not be understood exclusively to be a, for example, cylindrical, rotatably mounted machine element for transmitting torques, but rather a shaft should also be understood to refer to general connecting elements that connect individual components or elements to one another, in particular, connecting elements that connect multiple elements to one another for conjoint rotation.

If two components in the transmission are "connected for conjoint rotation," this means that these components have a permanent coupling, such that the two components cannot rotate independently of each other. This should therefore also be understood as a permanent rotary joint. In particular, there is no shift element between these components, which can be elements of the differential and/or also shafts and/or a nonrotating component of the transmission. An elastically rotating connection between two components is also understood to be permanent, or such that the elements rotate conjointly.

A "stationary component" should be understood as a rotationally and axially fixed component of the transmission, for example, a transmission housing or a component connected thereto for conjoint rotation. Relative movement cannot take place between the gear set element which is connected to a stationary component for conjoint rotation and the stationary component.

The first gear set element in the first planetary gear set is preferably connected to the first input shaft for conjoint rotation via a spline or a driving tooth system. This spline preferably has internal teeth on the first gear set element in the first planetary gear set and external teeth on the input shaft. The third gear set element in the first planetary gear set is preferably connected to the first output shaft for conjoint rotation via a spline or a driving tooth system. This spline preferably has internal teeth on the third gear set element in the first planetary gear set and external teeth on the first output shaft.

According to one preferred example embodiment of the invention, the ring gear of the first planetary gear set is monolithic, i.e., formed in one piece, and has a toothing on one end face, this toothing interlockingly engaging into a toothing on the sun gear of the second planetary gear set. Therefore, the ring gear of the first planetary gear set is toothed on an inner circumferential surface, the planet gears of the first planetary gear set meshing with these internal teeth, and toothed on the end face, the end-face teeth interlockingly engaging into the teeth provided therefor on the sun gear of the second planetary gear set. Furthermore, the sun gear of the second planetary gear set has external teeth, which mesh with the planet gears of the second planetary gear set. Therefore, the ring gear of the first planetary gear set and the sun gear of the second planetary gear set are both double-toothed. The toothing for the corotational connection between the ring gear of the first planetary gear set and the sun gear of the second planetary gear set is in the form of crown gearing. Therefore, the teeth of the toothing on the sun gear of the second planetary gear set extend essentially perpendicularly to the teeth of the toothing on the ring gear of the first planetary gear set. As a result, the installation of the ring gear of the first planetary gear set and of the sun gear of the second planetary gear set is improved, because the sun gear of the second planetary gear set can be mounted and inserted into the ring gear of the first planetary gear set, the securing ring axially fixing the sun gear of the second planetary gear set and the ring gear of the first planetary gear set. This connection is therefore disconnectable.

According to one preferred example embodiment of the invention, the securing ring is arranged in a circumferential groove on the toothing of the ring gear of the first planetary gear set. In other words, a groove for accommodating the securing ring is formed circumferentially by the toothing of the ring gear of the first planetary gear set, the securing ring at least partially radially entering the groove in order to axially secure the sun gear on the ring gear. In particular, the groove is formed on an inner circumferential surface of the ring gear. Preferably, the securing ring is in the form of a metallic snap ring.

According to one preferred example embodiment of the invention, the sun gear of the second planetary gear set has a thrust collar for axially securing the planet gears of the first planetary gear set, the thrust collar being arranged on the end face of the sun gear and extending circumferentially. Therefore, the thrust collar is not in the form of a separate component, but rather is integrated in the sun gear of the second planetary gear set. As a result, the number of components and the installation effort are reduced. The thrust collar comes to rest on the end face of the planet gears of the first planetary gear set, as a result of which the axial movement of the first planetary gear set is limited toward this side.

Preferably, a thrust collar disk for axially securing the planet gears of the first planetary gear set is arranged on an opposite side of the planet gears of the first planetary gear set and is connected to the ring gear of the first planetary gear set for conjoint rotation. In particular, the thrust collar disk has a toothing on an outer circumferential surface, which interlockingly engages into the internal teeth of the ring gear of the first planetary gear set. Preferably, a securing ring for axially securing the thrust collar disk is arranged on the ring gear of the first planetary gear set, the securing ring being arranged in a groove on an inner circumferential surface of the ring gear of the first planetary gear set. Preferably, the securing ring is in the form of a metallic snap ring.

According to one preferred example embodiment of the invention, the sun gear of the second planetary gear set is monolithic. Therefore, the two toothing sections and the thrust collar are integrally formed on the sun gear. As a result, components are eliminated and installation is simplified.

According to one alternative example embodiment of the invention, the sun gear of the second planetary gear set is of a multi-part design and has at least one support element and one sun gear element. As a result, the manufacture of the sun gear can be simplified, because the internal teeth on the sun gear can be broached, milled or ground according to demand without limitations with respect to geometry due to the support element. For example, the sun gear of the second planetary gear set is formed in two pieces, the toothing for engagement on the ring gear of the first planetary gear set and the thrust collar then being formed on the support element, and the toothing for the planet gears of the second planetary gear set being formed on the sun gear element. Preferably, the support element of the sun gear of the second planetary gear set is interlockingly connected to the ring gear of the first planetary gear set and is integrally bonded with the sun gear element. In other words, the interlocking connection between the ring gear of the first planetary gear set and the support element of the sun gear of the second planetary gear set is established via the toothing in the form of crown gearing, the integral bond between the support element of the sun gear of the second planetary gear set and the sun gear element of the sun gear of the second planetary gear set being established via at least one weld or adhesive joint.

For example, the support element of the sun gear of the second planetary gear set is formed by shaping a toothed sheet-metal disk. The shaped sheet-metal disk is manufactured separately from the sun gear element of the sun gear and subsequently integrally bonded with the sun gear element of the sun gear in order to form the sun gear of the second planetary gear set. The manufacture of the sun gear can be simplified as a result.

According to one preferred example embodiment of the invention, the first gear set element in the first planetary gear set is in the form of a sun gear, the third gear set element in the first planetary gear set being in the form of a planet carrier. In particular, planetary gear pins are arranged on the planet carrier of the first planetary gear set for rotatably mounting the planet gears of the first planetary gear set. According to one preferred example embodiment of the invention, the second gear set element in the second planetary gear set is in the form of a ring gear and the third gear set element in the second planetary gear set is in the form of a planet carrier. In particular, planetary gear pins are arranged on the planet carrier of the second planetary gear set for rotatably mounting the planet gears of the second planetary gear set.

According to one preferred example embodiment of the invention, an inner diameter of the ring gear of the first planetary gear set is greater than an inner diameter of the sun gear of the second planetary gear set. In particular, the inner diameter of the ring gear of the first planetary gear set is essentially the same size as the outer diameter of the sun gear of the second planetary gear set. This is considered to mean that the difference between the inner diameter of the ring gear of the first planetary gear set and the outer diameter of the sun gear of the second planetary gear set is less than ten percent (10%). As a result, the sun gear of the second planetary gear set can be connected to the ring gear of the first planetary gear set in a particularly simple and compact manner. Furthermore, the installation of the sun gear of the second planetary gear set and of the ring gear of the first planetary gear set is also simplified.

According to one preferred example embodiment of the invention, an outer diameter of the planet gears of the first planetary gear set is greater than an outer diameter of the planet gears of the second planetary gear set. Preferably, the outer diameter of the planet gears of the first planetary gear set is at least twice as great as an outer diameter of the planet gears of the second planetary gear set. As a result, the overall gear ratio of the integral differential is increased as compared to an integral differential having planet gears of the same size. Preferably, the outer diameter of the planet gears of the second planetary gear set is smaller than the outer diameter of the planet gears of the first planetary gear set by two-thirds (⅔). This further increases the overall gear ratio of the integral differential.

In particular, the particular planetary gear set is in the form of a negative planetary gear set. A negative planetary gear set corresponds to a planetary gear set having a planet carrier, on which first planet gears are rotatably mounted, and having a sun gear and a ring gear, wherein the teeth on at least one of the planet gears mesh with the teeth on the sun gear as well as with the teeth on the ring gear, as a result of which the ring gear and the sun gear rotate in opposite directions when the sun gear rotates while the planet carrier is held.

Alternatively, the particular planetary gear set is in the form of a positive planetary gear set. A positive planetary gear set differs from the negative planetary gear set in that the positive planetary gear set has first and second or inner and outer planet gears which are rotatably mounted on the planet carrier. The teeth of the first or inner planet gears mesh with the teeth of the sun gear and with the teeth of the second or outer planet gears. In addition, the teeth of the outer planet gears mesh with the teeth of the ring gear. As a result, the ring gear and the sun gear rotate in the same direction when the planet carrier is held. In the design of one or both planetary gear set(s) as a positive planetary gear set, the connection of the planet carrier and the ring gear is interchanged and the absolute value of the stationary transmission ratio is increased by one (1). Correspondingly, this is also possible the other way around when a negative planetary gear set is to be provided in place of a positive planetary gear set.

Alternatively, it is also conceivable to form one or multiple planetary gear set(s) as a stepped planetary gear set or stepped planetary gear sets. Each stepped planetary gear of the particular stepped planetary gear set preferably has a first gear wheel with a second gear wheel, which is connected thereto for conjoint rotation. The first gear wheel is preferably meshed, for example, with the sun gear and the second gear wheel is therefore meshed with the ring gear, or vice versa. These two gear wheels can be connected to each other for conjoint rotation, for example, via an intermediate shaft or a hollow shaft. In the case of a hollow shaft, the hollow shaft can be rotatably mounted on a pin of the planet carrier. The two gear wheels in the particular stepped planetary gear preferably have different diameters and numbers of teeth in order to set a gear ratio. Composite planetary gear sets are also conceivable.

A vehicle according to example aspects of the invention has a drive train, which includes a drive unit and a transmission according to example aspects of the invention. The transmission is drivingly connected to the drive unit. The drive unit is preferably an electric machine, wherein the input shaft of the transmission is a rotor of the electric machine or is connected or coupled to the rotor or to a rotor shaft for conjoint rotation. The rotor is mounted for rotation with respect to a stator in the electric machine, the stator being secured to the housing. The electric machine is preferably connected to an accumulator, which supplies the electric machine with electrical energy. Moreover, the electric machine is preferably controllable by way of an open-loop or closed-loop system by a power electronics system. Alternatively, the drive unit can also be an internal combustion engine, wherein the input shaft in this case is, for example, a crankshaft, or is connected or coupled to the crankshaft for conjoint rotation.

Preferably, the drive unit is coaxial to the integral differential. An additional speed change from the input shaft onto the rotor shaft or onto the rotor or onto the crankshaft of the drive unit is therefore not necessary. One of the output shafts axially extends through the drive unit in this case.

The drive train of the type described above is usable in a vehicle. The vehicle is preferably a motor vehicle, in particular an automobile (for example, a passenger car having a weight of less than three and a half tons (3.5 t)), a bus, or a truck (bus and truck, for example, having a weight of over three and a half tons (3.5 t)). In particular, the vehicle is an electric vehicle or hybrid vehicle. The vehicle has at least two axles, wherein one of the axles is formed by an axle that is drivable by the drive train. The drive train according to example aspects of the invention is operatively arranged on this drivable axle and the drive train transmits drive power from the drive unit onto the wheels on this axle via the transmission according to example aspects of the invention. It is also conceivable that there is a separate drive train of this type for each axle. The drive train is preferably front-wheel drive, in which the input shaft and the output shafts are substantially transverse to the longitudinal axis of the vehicle. Alternatively, the drive train can be at an angle to the longitudinal and lateral axes of the vehicle, wherein the output shafts are connected to the wheels on the particular axle with joints that are transverse to the longitudinal axis of the vehicle.

The above definitions and explanations of technological effects, advantages and advantageous example embodiments of the transmission according to example aspects of the invention also apply analogously to the power train according to example aspects of the invention, and vice versa.

BRIEF DESCRIPTION OF THE DRAWINGS

Exemplary embodiments of the invention are explained in greater detail in the following with reference to the schematic drawings, in which identical or similar elements are provided with the same reference characters, wherein.

DETAILED DESCRIPTION

Figure 1:
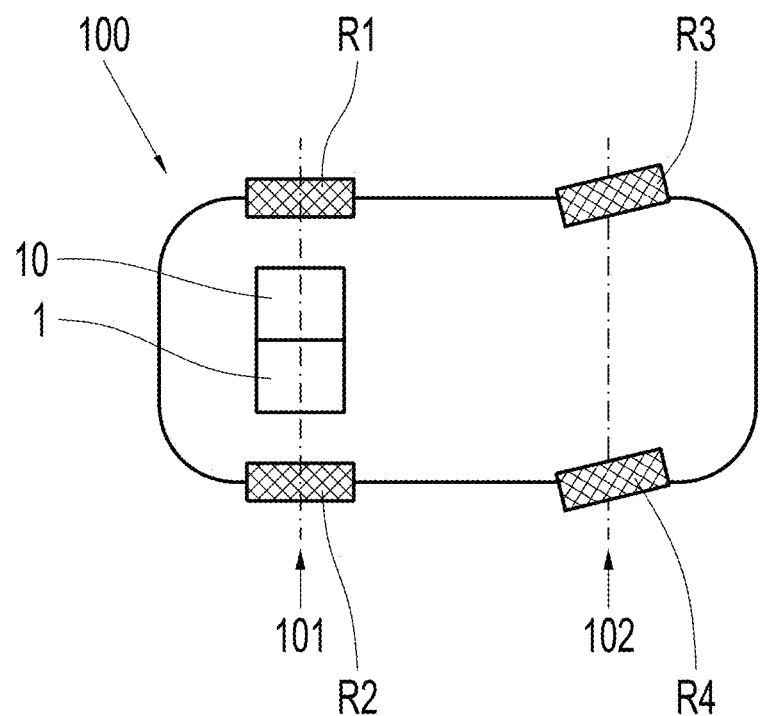
FIG. 1 shows a highly schematic view of a vehicle with a drive train, which has a transmission according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a vehicle 100 having a first axle 101 with two vehicle wheels R1, R2 and a second axle 102 with two vehicle wheels R3, R4. In the present case, the first axle 101 is in the form of a rear drive axle of the vehicle 100 and has a drive train with a drive unit 10, which is in the form of an electric machine, and a transmission 1 according to example aspects of the invention. The drive unit 10 is designed to generate drive power and is drivingly connected to the transmission 1. Therefore, the vehicle 100 is in the form of an electric vehicle, i.e., an electrically driven vehicle. The drive unit 10 is arranged coaxially with the transmission 1 and transversely to the vehicle longitudinal direction and is connected via an integral differential in the transmission 1 to the vehicle wheels R1, R2 on the first axle 101. In the present case, a further drive train is not arranged on the second axle 102, i.e., on the front axle of the vehicle 100, as a result of which costs, weight and installation space are reduced. Alternatively, the drive train can be arranged on the front axle of the vehicle 100 rather than on the rear axle. In order to implement an all-wheel drive system, a further drive train can be arranged on the second axle 102 and drivingly connected to the vehicle wheels R3, R4 on this wheel axle 102.

Figure 2:
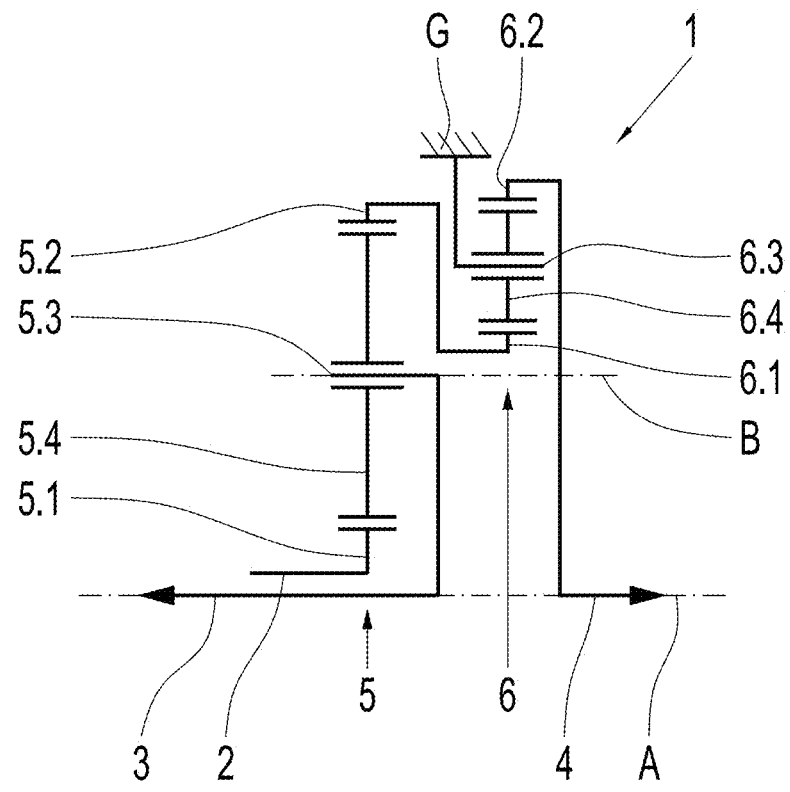
FIG. 2 shows a highly schematic view of a cutout portion of the transmission according to example aspects of the invention.
Figure 3:
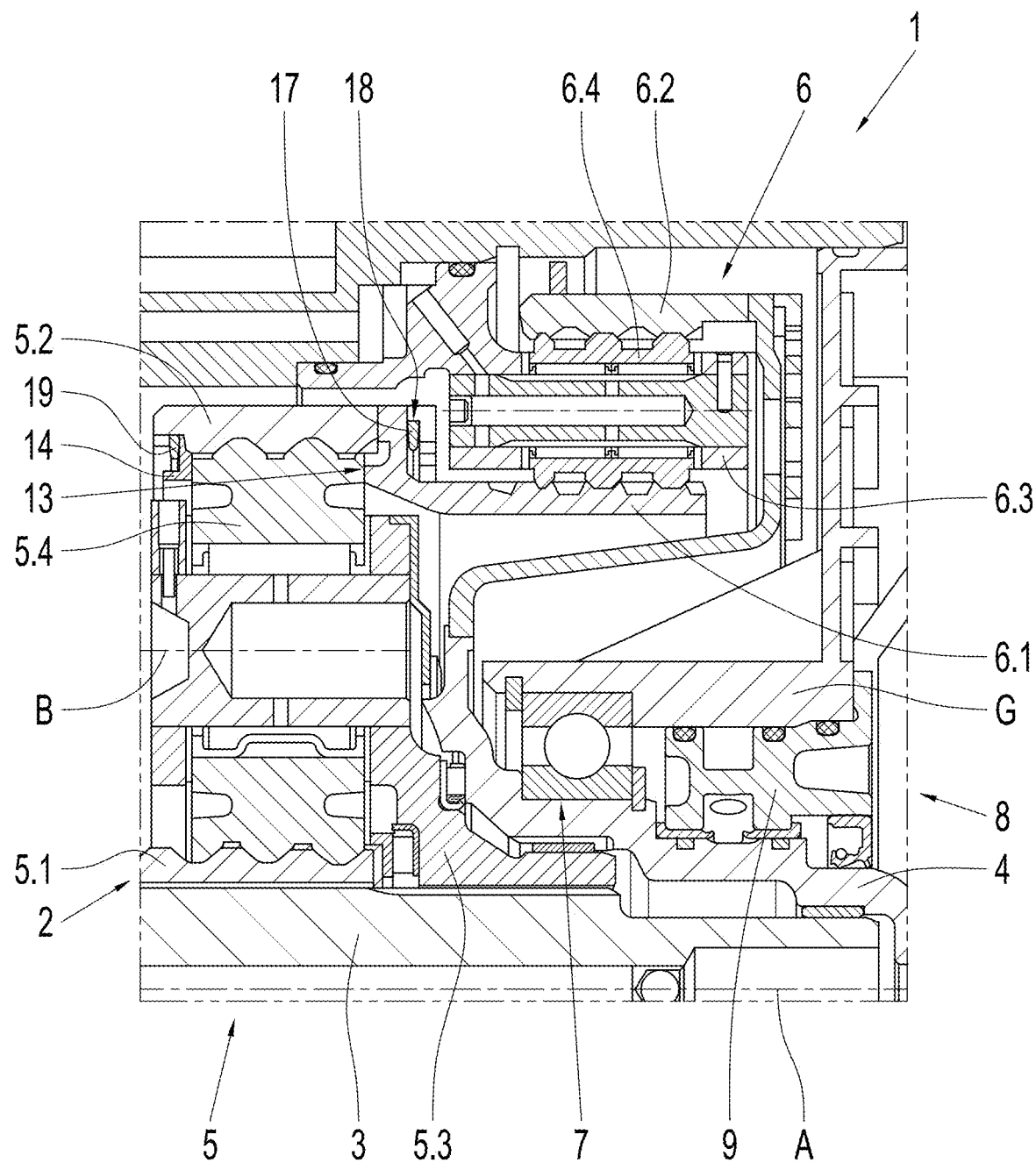
FIG. 3 shows a detailed schematic sectional view of a cutout portion of the transmission according to example aspects of the invention.

FIG. 2 and FIG. 3 show a cutout portion of the transmission 1 according to example aspects of the invention, according to a first example embodiment, the integral differential being the focus in the present case. The transmission 1 has an input shaft 2, a first output shaft 3, a second output shaft 4, and a first planetary gear set 5 and a second planetary gear 6. The two planetary gear sets 5, 6 form the integral differential and are arranged in the power flow between the input shaft 2 and the two output shafts 3, 4. A first output torque is transmittable onto the first output shaft 3 by the first planetary gear set 5. A support torque of the first planetary gear set 5 is convertible in the second planetary gear set 6 such that a second output torque, which corresponds to the first output torque, is transmittable onto the second output shaft 4.

A first gear set element in the first planetary gear set 5 is in the form of a sun gear 5.1 and is connected to the input shaft 2 for conjoint rotation. A second gear set element in the first planetary gear set 5 is in the form of a ring gear 5.2 and is connected to a first gear set element, which is in the form of a sun gear 6.1, of the second planetary gear set 6 for conjoint rotation. A third gear set element in the first planetary gear set 5 is in the form of a planet carrier 5.3 and is connected to the first output shaft 3 for conjoint rotation. Multiple planet gears 5.4 are rotatably mounted on the planet carrier 5.3 of the first planetary gear set 5, each planet gear 5.4 meshing with the sun gear 5.1 and the ring gear 5.2 of the first planetary gear set 5. A second gear set element in the second planetary gear set 6 is in the form of a ring gear 6.2 and is connected to the second output shaft 4 for conjoint rotation. A third gear set element in the second planetary gear set 6 is in the form of a planet carrier 6.3 and is connected to a stationary component, which is in the form of a housing G, for conjoint rotation. Multiple planet gears 6.4 are rotatably mounted on the planet carrier 6.3 of the second planetary gear set 6, each planet gear 6.4 meshing with the sun gear 6.1 and the ring gear 6.2 of the second planetary gear set 6. The second planetary gear set 6 is axially adjacent to the first planetary gear set 5, and the planet gears 5.4 of the first planetary gear set 5 do not axially overlap the planet gears 6.4 of the second planetary gear set 6. The two planetary gear sets 5, 6 rotate about a common rotation axis A of the transmission 1. The two output shafts 3, 4 are arranged on the common rotation axis A of the transmission 1 and are connected to a respective wheel of the vehicle. This is shown in a simplified manner in the present case by a respective arrow at the respective output shaft 3, 4.

The planet gears 5.4 of the first planetary gear set 5 have a greater outer diameter than the planet gears 6.4 of the second planetary gear set 6. The second planetary gear set 6 is arranged with its gear set elements in a radial direction outside a rotation axis B of the respective planet gear 5.4 of the first planetary gear set 5. Therefore, the planet gears 6.4 of the second planetary gear set 6 are radially further remote from the common rotation axis A than the planet gears 5.4 of the first planetary gear set 5. As a result, installation space is created radially inside the second planetary gear set 6. This installation space can be advantageously used, in particular, for supporting points and an oil feed.

FIG. 3 shows the cutout portion of the transmission according to FIG. 2 in greater detail. The second planetary gear set 6 is axially adjacent to the first planetary gear set 5, the planet gears 5.4 of the first planetary gear set 5 having no axial overlap with the planet gears 6.4 of the second planetary gear set 6. The second gear set element in the first planetary gear set 5, which is in the form of a ring gear 5.2, is connected to the first gear set element, which is in the form of a sun gear 6.1, of the second planetary gear set 6 for conjoint rotation. For this purpose, the sun gear 6.1 of the second planetary gear set 6 is arranged on an end face of the ring gear 5.2 of the first planetary gear set 5 and axially fixed by a securing ring 17. The ring gear 5.2 of the first planetary gear set 5 has a greater outer diameter than the sun gear 6.1 of the second planetary gear set 6. An inner diameter of the ring gear 5.2 of the first planetary gear set 5 is also greater than an inner diameter of the sun gear 6.1 of the second planetary gear set 6. Furthermore, the sun gear 6.1 of the second planetary gear set 6 has a thrust collar 13 for axially securing the planet gears 5.4 of the first planetary gear set 5, the thrust collar 13 being arranged on the end face of the sun gear 6.1 and extending circumferentially. A thrust collar disk 14 for axially securing the planet gears 5.4 of the first planetary gear set 5 is arranged on an opposite side of the planet gears 5.4 of the first planetary gear set 5 and is connected to the ring gear 5.2 of the first planetary gear set 5 for conjoint rotation. Furthermore, the thrust collar disk 14 is axially fixed on the ring gear 5.2 by a securing ring 19. Both securing rings 17, 19 are in the form of snap rings.

A bearing element 7 for mounting the second output shaft 4 is arranged radially inside the second planetary gear set 6 and axially overlapping the second planetary gear set 6. Furthermore, an oil feed 8 for the second output shaft 4 is arranged radially inside the second planetary gear set 6 and axially overlapping the second planetary gear set 6. The oil feed 8 includes a ring element 9, which is arranged radially between a stationary component, which is in the form of a housing G, and the second output shaft 4. The bearing element 7 is in the form of a grooved ball bearing and is supported against the stationary component, which is in the form of a housing G. Due to the fact that the particular outer diameter of the planet gears 5.4 of the first planetary gear set 5 is more than twice as great as the particular outer diameter of the planet gears 6.4 of the second planetary gear set 6, the overall gear ratio of the integral differential is greatly increased. This increase in the overall gear ratio is neutral with respect to installation space due to the advantageous arrangement of the bearing element 7 and of the oil feed 8 within the second planetary gear set 6, and therefore results in a particularly compact transmission 1.

Figure 4:
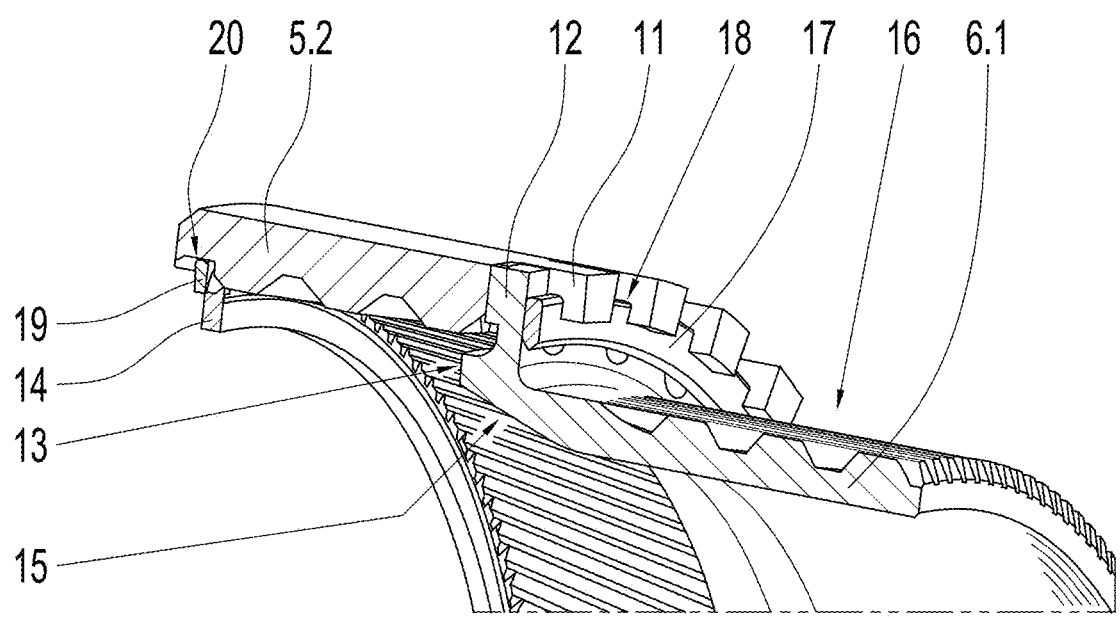
FIG. 4 shows a perspective sectional view of a cutout portion of the transmission according to example aspects of the invention.

FIG. 4 shows the sun gear 6.1 of the second planetary gear set 6, the ring gear 5.2 of the first planetary gear set 5, the two securing rings 17, 19, which are arranged on the ring gear 5.2, and the thrust collar disk 14 according to FIG. 3, isolated from the other components of the transmission 1. The sun gear 6.1 of the second planetary gear set 6 is monolithic, i.e., formed in one piece, and has a first section, which is in the form of a support element 15, and a second section, which is in the form of a sun gear element 16. A toothing 12, which extends outward in a radial direction, and the thrust collar 13, which extends in an axial direction toward the planet gears of the first planetary gear set, are formed on the first section, which is in the form of a support element 15. By comparison, an outer toothing is formed on the second section, which is in the form of a sun gear element 16, the outer toothing being designed to mesh with the planet gears of the second planetary gear set in the installed state. The ring gear 5.2 of the first planetary gear set 5 is monolithic and has a toothing 11 on the end face, the toothing 11 extending in an axial direction and interlockingly engaging into the toothing 12 on the sun gear 6.1 of the second planetary gear set 6. The securing ring 17 is arranged in a circumferential groove 18 on the toothing 11 of the ring gear 5.2 of the first planetary gear 5 and axially secures the sun gear 6.1 on the ring gear 5.2. Furthermore, the ring gear 5.2 has internal teeth, which are designed to mesh with the planet gears of the first planetary gear set in the installed state. The thrust collar disk 14 is axially secured on the ring gear 5.2 with the securing ring 19, which is arranged in a circumferential groove 20 on the inner circumferential surface of the ring gear 5.2.

Figure 5:
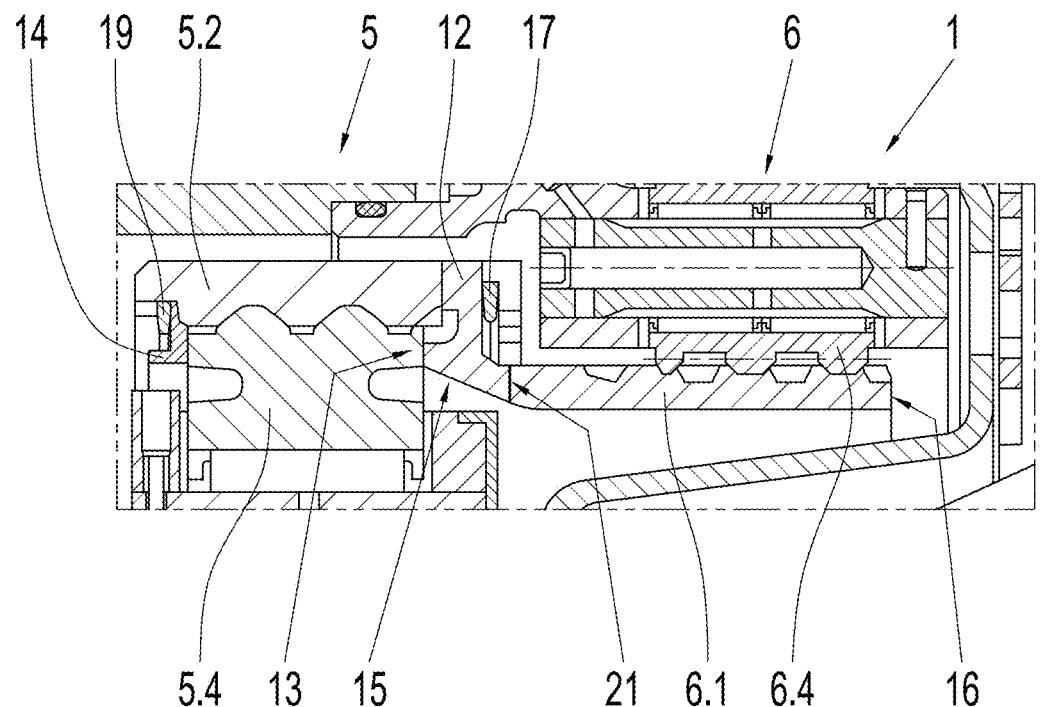
FIG. 5 shows a schematic sectional view of a cutout portion of the transmission according to example aspects of the invention, according to a second exemplary embodiment.

FIG. 5 shows a second example embodiment of the transmission 1 according to example aspects of the invention. The transmission 1 according to FIG. 5 substantially corresponds to the transmission 1 according to FIG. 3. The difference between these two example embodiments involves the design of the sun gear 6.1 of the second planetary gear set 6. In the present case, the sun gear 6.1 of the second planetary gear set 6 is not monolithic, but rather is formed in two pieces and has a support element 15 and a sun gear element 16. The support element 15 of the sun gear 6.1 of the second planetary gear set 6 is interlockingly connected via the toothing 12 to the ring gear 5.2 of the first planetary gear set 5 and is integrally bonded to the sun gear element 16 via a weld 21. As a result, the manufacture of the outer toothing of the sun gear 6.1, which is formed on the sun gear element 16, can advantageously take place without substantial limitations with respect to geometry. The toothing 12 for connecting the ring gear 5.2 to the first planetary gear set 5 for conjoint rotation and the thrust collar 13, which extends in an axial direction toward the planet gears 5.4 of the first planetary gear set 5, are formed on the support element 15. Otherwise, the exemplary embodiment according to FIG. 5 corresponds to the exemplary embodiment according to FIG. 3, to which reference is made.

Figure 6:
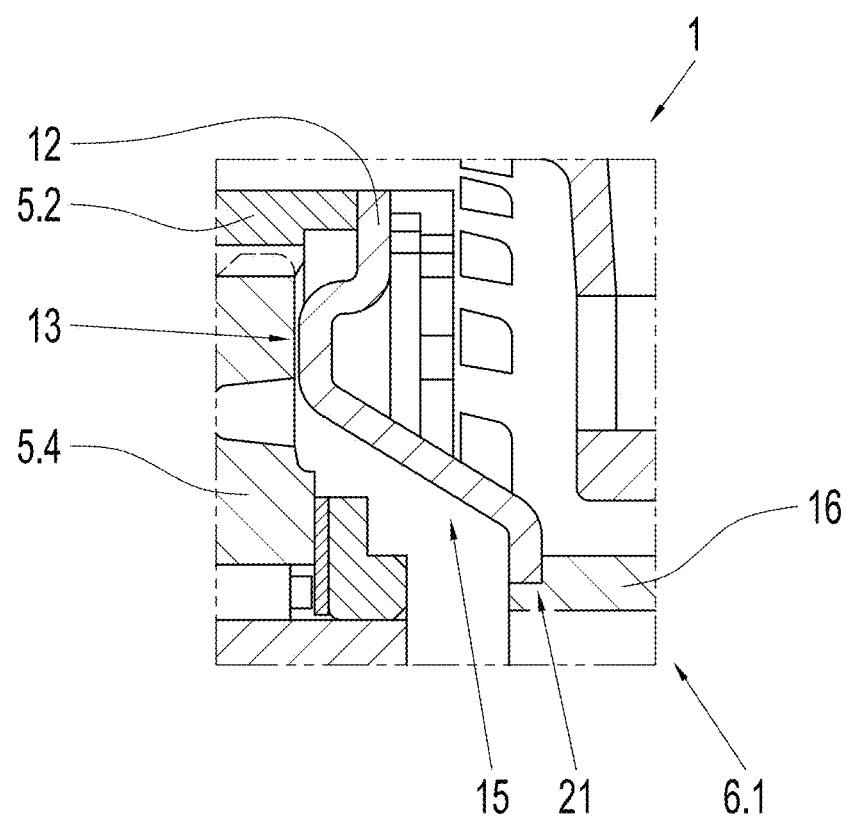
FIG. 6 shows a schematic sectional view of a cutout portion of the transmission according to example aspects of the invention, according to a third exemplary embodiment.

FIG. 6 shows a third example embodiment of the transmission 1 according to example aspects of the invention. The focus is on the support element 15 of the sun gear 6.1 of the second planetary gear set 6. The transmission 1 according to FIG. 6 substantially corresponds to the transmission 1 according to FIG. 5. The difference between these two example embodiments involves the design of the support element 15 of the sun gear 6.1 of the second planetary gear set 6. In the present case, the support element 15 of the sun gear 6.1 of the second planetary gear set 6 is formed by shaping a toothed sheet-metal disk. The support element 15 of the sun gear 6.1 of the second planetary gear set 6 is interlockingly connected via the toothing 12 to the ring gear 5.2 of the first planetary gear set 5 and is integrally bonded to the sun gear element 16 via a weld 21. The toothing 12 for connecting the ring gear 5.2 to the first planetary gear set 5 for conjoint rotation as well as the thrust collar 13, which extends in an axial direction toward the planet gears 5.4 of the first planetary gear set 5, are formed on the support element 15. Otherwise, the exemplary embodiment according to FIG. 6 corresponds to the exemplary embodiment according to FIG. 5, to which reference is made.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

1 transmission
2 input shaft
3 first output shaft
4 second output shaft
5 first planetary gear set
5.1 sun gear of the first planetary gear set
5.2 ring gear of the first planetary gear set
5.3 planet carrier of the first planetary gear set
5.4 planet gear of the first planetary gear set
6 second planetary gear set
6.1 sun gear of the second planetary gear set
6.2 ring gear of the second planetary gear set
6.3 planet carrier of the second planetary gear set
6.4 planet gear of the second planetary gear set
7 bearing element
8 oil feed
9 ring element
10 prime mover
11 toothing on the ring gear
12 toothing on the sun gear
13 thrust collar
14 thrust collar disk
15 support element
16 sun gear element
17 securing ring
18 groove
19 securing ring
20 groove
21 weld
G housing
A rotation axis
B rotation axis
100 vehicle
101 first axle
102 second axle
R1 vehicle wheel
R2 vehicle wheel
R3 vehicle wheel
R4 vehicle wheel

What is claimed:

1. A transmission (1) for a drive train of a vehicle (100), comprising:
    an input shaft (2);
    a first output shaft (3);
    a second output shaft (4); and
    a differential arranged in power flow between the input shaft (2) and the first and second output shafts (3, 4), the differential comprising a first planetary gear set (5) with a plurality of planet gears (5.4) and a plurality of gear set elements, the differential comprising a second planetary gear set (6) with a plurality of planet gears (6.4) and a plurality of gear set elements, a first output torque transmittable onto the first output shaft (3) by the first planetary gear set (5), a support torque of the first planetary gear set (5) convertible in the second planetary gear set (6) such that a second output torque corresponding to the first output torque is transmittable onto the second output shaft (4), wherein a first gear set element of the gear set elements of the first planetary gear set (5) is connected to the input shaft (2) for conjoint rotation,
    wherein a third gear set element of the gear set elements of the first planetary gear set (5) is connected to the first output shaft (3) for conjoint rotation,
    wherein a second gear set element of the gear set elements of the second planetary gear set (6) is connected to the second output shaft (4) for conjoint rotation,
    wherein a third gear set element of the gear set elements of the second planetary gear set (6) is connected to a stationary component for conjoint rotation,
    wherein the second planetary gear set (6) is axially adjacent the first planetary gear set (5), and the planet gears (5.4) of the first planetary gear set (5) do not axially overlap the planet gears (6.4) of the second planetary gear set (6),
    wherein a second gear set element of the gear set elements of the first planetary gear set (5) comprises a ring gear (5.2) and is connected to a first gear set element of the gear set elements of the second planetary gear set (6) for conjoint rotation, the first gear set element of the gear set elements of the second planetary gear set (6) comprises a sun gear (6.1), and the sun gear (6.1) of the second planetary gear set (6) is arranged on an end face of the ring gear (5.2) of the first planetary gear set (5), and wherein an outer diameter of the planet gears (5.4) of the first planetary gear set (5) is at least twice as great as an outer diameter of the planet gears (6.4) of the second planetary gear set (6).

2. The transmission (1) of claim 1, wherein the ring gear (5.2) of the first planetary gear set (5) is monolithic and has a toothing (11) on one end face, the toothing meshed with a toothing (12) on the sun gear (6.1) of the second planetary gear set (6).

3. The transmission (1) of claim 1, wherein the sun gear (6.1) of the second planetary gear set (6) comprises a thrust collar (13) for axially securing the planet gears (5.4) of the first planetary gear set (5), the thrust collar (13) arranged on an end face of the sun gear (6.1) and extending circumferentially.

4. The transmission (1) of claim 3, further comprising a thrust collar disk (14) configured for axially securing the planet gears (5.4) of the first planetary gear set (5) is arranged on an opposite side of the planet gears (5.4) of the first planetary gear set (5) and is connected to the ring gear (5.2) of the first planetary gear set (5) for conjoint rotation.

5. The transmission (1) of claim 1, wherein the sun gear (6.1) of the second planetary gear set (8) is monolithic.

6. The transmission (1) of claim 1, wherein the sun gear (6.1) of the second planetary gear set (6) is of a multi-part assembly comprising a support element (15) and a sun gear element (16).

7. The transmission (1) of claim 6, wherein the support element (15) of the sun gear (6.1) of the second planetary gear set (6) is interlockingly connected to the ring gear (5.2) of the first planetary gear set (5) and is integrally bonded with the sun gear element (16).

8. The transmission (1) of claim 6, wherein the support element (15) of the sun gear (6.1) of the second planetary gear set (6) comprises a shaped, toothed sheet-metal disk.

9. The transmission (1) of claim 1, wherein a securing ring (17) is arranged in a circumferential groove (18) on a toothing (11) of the ring gear (5.2) of the first planetary gear set (5).

10. The transmission (1) of claim 1, wherein:
the first gear set element of the first planetary gear set (5) comprises a sun gear (5.1);
the third gear set element of the first planetary gear set (5) comprises a planet carrier (5.3);
the second gear set element of the second planetary gear set (6) comprises a ring gear (6.2); and
the third gear set element of the second planetary gear set (6) comprises a planet carrier (6.3).

11. The transmission (1) of claim 1, wherein an inner diameter of the ring gear (5.2) of the first planetary gear set (5) is greater than an inner diameter of the sun gear (6.1) of the second planetary gear set (6).

12. The transmission (1) of claim 1, wherein the outer diameter of the planet gears (6.4) of the second planetary gear set (6) is smaller than the outer diameter of the planet gears (5.4) of the first planetary gear set (5) by two-thirds.

13. A vehicle (100), comprising a drive train with a drive unit (10) and the transmission (1) of claim 1.

* * * * *